United States Patent [19]
Dowd et al.

[11] Patent Number: 4,865,819
[45] Date of Patent: Sep. 12, 1989

[54] PACKING SUPPORT GRID

[75] Inventors: Edward J. Dowd, Palatine; Thomas J. Crowe, Mt. Prospect, both of Ill.

[73] Assignee: Ari Technologies, Inc., Palatine, Ill.

[21] Appl. No.: 161,735

[22] Filed: Feb. 29, 1988

[51] Int. Cl.[4] .............................................. B01D 53/00
[52] U.S. Cl. ..................................... 422/211; 261/94; 422/311; 423/210; 423/224
[58] Field of Search ............................. 422/311, 211; 261/DIG. 72, 94–97; 423/224, 210

[56] References Cited

U.S. PATENT DOCUMENTS

| | | | |
|---|---|---|---|
| 3,653,845 | 4/1972 | Moravec | 422/311 |
| 4,011,304 | 3/1977 | Mancini et al. | 423/573 |
| 4,090,852 | 5/1978 | Dowd | 422/143 |
| 4,189,462 | 2/1980 | Thompson | 423/573 |
| 4,218,342 | 8/1980 | Thompson | 502/167 |
| 4,374,104 | 2/1983 | Primack | 423/226 |
| 4,455,287 | 6/1984 | Primack et al. | 423/573 R |
| 4,511,544 | 4/1985 | Connell et al. | 423/224 |
| 4,622,212 | 11/1986 | McManus et al. | 423/226 |
| 4,744,929 | 5/1988 | Robinson et al. | 261/94 X |

OTHER PUBLICATIONS

"The Use of Lo-Cat in the Sable San Andres CO2 Miscible Flood Project," George S. Price, Brian C. Price, and Les C. Hardison, AIChE Spring Meeting, New Orleans, Louisiana, Apr. 9, 1986.

Primary Examiner—Robert J. Hill Jr.
Assistant Examiner—Jill Johnston
Attorney, Agent, or Firm—Marshall, O'Toole, Gerstein, Murray & Bickell

[57] ABSTRACT

Solids plugging problems are often encountered during liquid-gas containing operations using a packed tower contactor. The invention alleviates or avoids such problems by providing a novel packing support grid characterized by a large total open area and large individual openings. The grid comprises vertically spaced upper and lower sets of laterally spaced bars. The vertical and lateral spacings are selected with respect to the size of the packing elements so that the packing elements cannot drop through the grid but at the same time the total open area of the grid is very large.

20 Claims, 2 Drawing Sheets

PACKING SUPPORT GRID

This invention relates to a novel and improved grid for supporting the packing bed in a packed tower or column used for liquid-gas contacting. More particularly, the invention relates to a novel and improved packing support grid for use in situations where the packed tower or column is prone to undergo plugging.

BACKGROUND OF THE INVENTION

It is well known that a packed tower or column is often the most efficient contacting apparatus for liquid-gas contacting operations. However, in many such operations, the fluid passing through the packing bed will contain suspended or slurried solid particles which tend to accumulate on the packing or the packing support, resulting eventually in plugging of the tower.

Such plugging problems occur, for example, when a packed tower is used for cleaning a gas stream containing particulate material by liquid scrubbing of the gas stream. Plugging also occurs when a packed tower contactor is used to carry out a chemical process in which a component of a gas stream is reacted with a liquid to yield a solid reaction product in particle form. For example, in flue gas scrubbing with an aqueous solution or suspension of limestone or the like to remove sulfur dioxide, a calcium sulfate slurry is formed which causes plugging problems. Another example is a liquid phase oxidation process for removal of hydrogen sulfide from a gas stream in which the treating or scrubbing liquid is an oxidizing solution that effects oxidation of hydrogen sulfide to elemental sulfur particles that cause plugging of the packed tower.

SUMMARY OF THE INVENTION

The broad object of the invention is to provide a novel and improved packing support grid for use in a packed tower in order to alleviate or avoid plugging problems during a liquid-gas contacting operation in which plugging of the packing tends to occur.

Another object of the invention is to provide a novel and improved packing support grid for use in a packed tower contactor which permits the packing to be washed in place when plugging occurs.

Other objects of the invention are to provide a novel and improved packed tower apparatus and a novel and improved liquid-gas contacting method using such apparatus, which minimize or avoid plugging problems in the packed tower.

In general, the foregoing objects of the invention are achieved by providing in a packed tower contactor a packing support grid that is characterized by a large total open area, by large individual openings for the free passage of solids, and by effective structural integrity and load carrying capacity. The large open area of the grid avoids high upward gas velocities in the tower which promote accumulation of solids on the packing. The large individual openings in the grid permit free downward flow of solids slurry so as to avoid accumulation of solids on the grid itself.

In a preferred embodiment of the invention, the packing support grid comprises at least two vertically spaced upper and lower layers or sets of laterally spaced bars. The bars of the upper set are positioned so as to overlie the lateral spaces between the bars of the lower set. The vertical and lateral spacings of the bars are selected and coordinated with respect to the size of the packing elements so that the packing elements cannot drop through the grid while at the same time the total open area of the grid is extremely large, preferably approximating 100% of the internal cross sectional area of the tower.

BRIEF DESCRIPTION OF THE DRAWINGS

A more detailed description of the features and advantages of the invention is provided in connection with the accompanying drawings, wherein.

DETAILED DESCRIPTION OF THE INVENTION

For purposes of illustration only, and not by way of limitation, the invention will be described hereafter with specific reference to a liquid phase oxidation process for the removal of hydrogen sulfide from a gas stream. In a process of this type, e.g., the Stretford Process or the Lo-Cat Process, the hydrogen sulfide containing gas is contacted or scrubbed in a liquid-gas contactor or scrubber with a suitable aqueous treating solution, e.g., an oxidizing solution containing a polyvalent metal in its higher valence state. In the contactor or scrubber, the hydrogen sulfide is oxidized to elemental sulfur particles that are suspended or slurried in the treating solution, and the polyvalent metal is reduced to its lower valence state. The used solution is regenerated by contacting it in an oxidizer with air or other oxygen containing gas to convert the reduced polyvalent metal to its higher valence state for reuse in the contactor or scrubber. The sulfur formed in the contactor or scrubber is recovered from the aqueous treating solution by flotation, settling, filtration, or other suitable separation technique.

When using a packed tower contactor, counter-current contacting is usually preferred but concurrent contacting can be used under some circumstances. In a countercurrent system, the hydrogen sulfide containing gas is passed upwardly through the packing bed and the aqueous treating solution is passed downwardly through the packing bed in intimate contact with the upwardly flowing gas stream. The sulfur particles formed by the oxidation of hydrogen sulfide tend to accumulate on the packing or on the packing support grid resulting in eventual plugging of the tower. In most instances, the plugged tower must be taken out of service for removal and washing of the packing and for cleaning of the support grid. Consequently, it is usually necessary to provide two or more packed towers so that at least one tower is available for continuous operation of the process while the other tower is being serviced.

Figure 1:
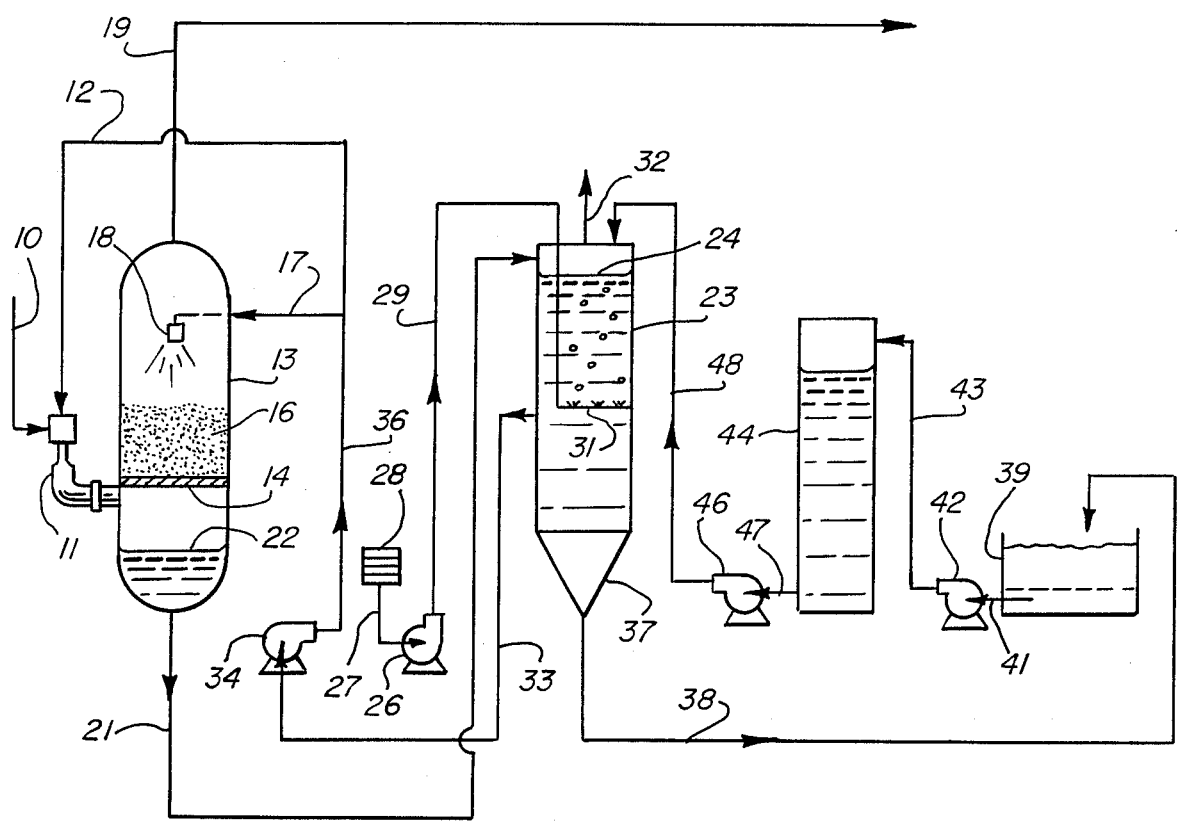
FIG. 1 is a simplified flow diagram of a liquid phase oxidation process for removing hydrogen sulfide from a gas stream using a packed tower contactor in accordance with the present invention.

A particularly useful process for liquid phase oxidation of hydrogen sulfide in a gas stream is the Lo-Cat Process in which the treating solution is an aqueous catalytic solution of a chelated polyvalent metal, particularly iron. FIG. 1 is an illustration of one manner of utilizing the present invention in the Lo-Cat process.

A feed gas stream containing hydrogen sulfide is introduced through line 10 to a venturi mixer 11 where the gas is intimately premixed with regenerated chelated iron solution supplied to the venturi mixer through line 12. The outlet from the venturi mixer communicates with the lower portion of a vertical contacting or scrubbing tower 13. A packing support grid constructed in accordance with the present invention is shown schematically at 14 and is mounted in the tower 13 above the venturi outlet connection. A bed of discrete packing elements, shown schematically at 16, is supported on the grid 14. Regenerated treating solution is supplied to the upper portion of the tower 13 through a line 17 and a spray nozzle 18. An effluent gas line 19 extends from the upper portion of the tower 13 above the spray nozzle 18, and a liquid withdrawal line 21 extends from the lower portion of the tower 13 below the venturi outlet connection.

The feed gas with entrained treating solution passes upwardly through the packing bed 16, and treating solution from the spray nozzle 18 passes downwardly through the bed 16 in countercurrent contact with the upwardly flowing gas stream. Although countercurrent gas-liquid contact in the tower 13 is preferred, the invention is not limited to countercurrent flow. The treated gas substantially free of hydrogen sulfide is removed from the upper portion of the contactor through line 19. The liquid slurry of treating solution and suspended sulfur particles accumulates in the bottom portion of the tower 13, as indicated by the liquid level line 22, and the slurry is withdrawn at a controlled rate through line 21.

The used treating solution containing ferrous ions is regenerated by passing the slurry from line 21 into the upper portion of an oxidizer vessel 23 where the slurry accumulates as shown by the liquid level line 24. Air is supplied to the oxidizer 23 by means of a blower 26 having an inlet line 27 with a filter 28 and an outlet line 29 connected to a sparger ring 31 located in the oxidizer 23 substantially below the liquid level 24. Air from the sparger ring 31 bubbles upwardly through the used treating solution and oxidizes the chelated ferrous ions to chelated ferric ions. The air, having a slightly diminished oxygen content, is vented from the upper portion of the oxidizer 23 through a line 32. The regenerated treating solution is withdrawn from the oxidizer 23 below the sparger ring 31 through a suction line 33 by means of a recirculating pump 34 and is supplied to the tower 13 through a discharge line 36 connected to the lines 17 and 12.

In the oxidizer vessel 23, a major portion of the sulfur settles to a cone-shaped bottom portion 37 so that the treating solution withdrawn through line 33 for recirculation to the tower 13 contains only a minor amount of sulfur. A dense slurry of sulfur particles is supplied from the bottom portion 37 through a line 38 to a sulfur filter 39. The sulfur-free filtrate is withdrawn from the filter 39 through a line 41 by a pump 42 and is discharged through line 43 to a surge tank 44. A pump 46 withdraws filtrate from the tank 44 through a line 47 and returns it through a discharge line 48 to the upper portion of the oxidizer vessel 23.

It will be understood that the process configuration shown in FIG. 1 is only illustrative and that various other Lo-Cat Process arrangements and features familiar to those skilled in the art can be used, e.g., as disclosed in U.S. Pat. Nos. 4,011,304, 4,189,462, 4,218,342, 4,374,104, 4,455,287, and 4,622,212.

Any suitable chelating agent may be used for formulating the chelated polyvalent metal catalyst solution used in the Lo-Cat Process, particularly the aminopolycarboxylic acid type chelating agents and the polyhydroxy type chelating agents.

The useful aminopolycarboxylic acid type chelating agents include monoaminopolycarboxylic acids, polyaminopolycarboxylic acids, polyaminoalkyl polycarboxylic acids, and polyaminohydroxyalkyl polycarboxylic acids. Usually, the aforementioned types of chelating agents, either singly or as a mixture, will be used in the form of their alkali metal salts, particularly the sodium salts. The polyaminopolyacetic acids and the polyaminohydroxyethyl polyacetic acids, or their sodium salts, are particularly desirable. Specific examples of particularly useful chelating agents within the foregoing class are nitrilotriacetic acid (NTA), ethylenediaminetetraacetic acid (EDTA), N-hydroxyethyl ethylenediamine triacetic acid (HEDTA), and diethylenetriamine pentaacetic acid (DTPA).

The useful polyhydroxy type chelating agents include monosaccharides (such as glucose and fructose), disaccharides (such as sucrose, lactose, and maltose), reduced monosaccharides (such as sorbitol), reduced disaccharides (such as mannitol), monosaccharide acids (such as glucoheptanoic acid), disaccharide acids (such as gluconic acid), and their alkali metal salts. In particular, sorbitol is a preferred chelating agent of this type. The use of an aminopolycarboxylic acid type chelating agent in combination with a polyhydroxy type chelating agent is particularly useful, as disclosed in U.S. Pat. Nos. 4,189,462 and 4,218,342 which are incorporated herein by reference. As explained in these patents, the combination of the two types of chelating agents insures that the iron will be retained in solution over a wide range of pH and other process conditions.

Although iron is the polyvalent metal of choice, other polyvalent metals that form chelates with aminopolycarboxylic acid type and polyhydroxy type chelating agents can also be used, including copper, vanadium, manganese, platinum, tungsten, nickel, mercury, tin, and lead.

The chelated iron catalyst solution is preferably prepared by dissolving a suitable iron salt in water, separately dissolving the chelating agent in water, and mixing the two solutions to provide a concentrate. The pH of the concentrate may be acidic, akaline, or neutral, and the pH of the concentrate may be adjusted, if desired, by adding the required amount of an alkaline material or acidic material. An appropriate amount of the concentrate can be diluted with water as required to obtain he desired amount of initial operating solution having the desired iron content. Replacement chelated iron may be added to the system as the concentrate.

The contacting of the feed gas with the treating solution in the tower 13 may be carried out at ambient conditions of temperature and pressure, but temperatures of from about 5° to about 65° C. and pressures ranging from subatmospheric to 100 atmospheres or greater can be used. An alkaline or substantially alkaline pH ranging from about 6 to about 13, particularly from about 6 to about 10.5, is preferably maintained by adding alkaline or acidic material as required. The redox potential of the solution may be used as a measure of catalyst activity as reflected by the ratio of ferric to ferrous ions in solution. Maintaining a redox potential of from about $-50$ to about $-200$, as measured by a calomel electrode, is desirable.

Figure 3:
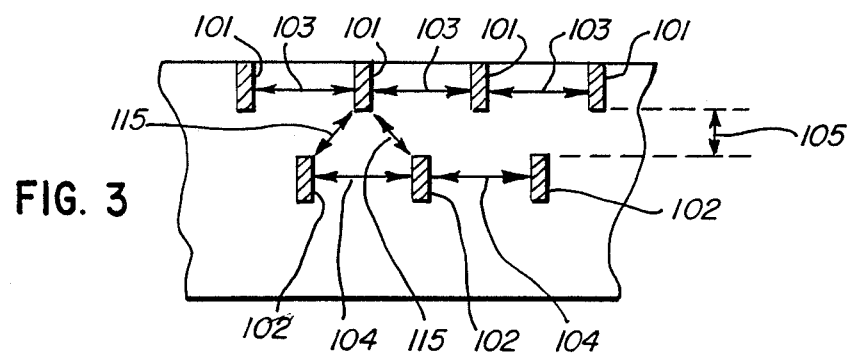
FIG. 3 is a fragmentary cross sectional view as seen along the line 3—3 of FIG. 2.
Figure 4:
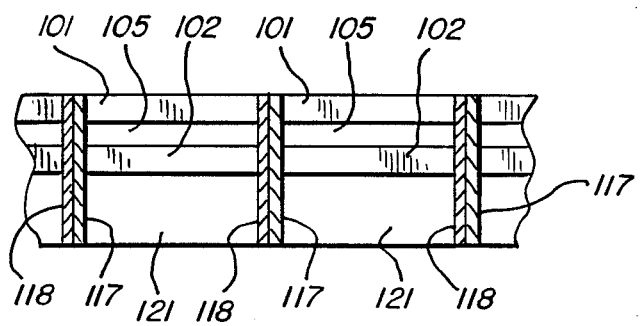
FIG. 4 is a fragmentary cross sectional view as seen along the line 4—4 of FIG. 2.
Figure 2:
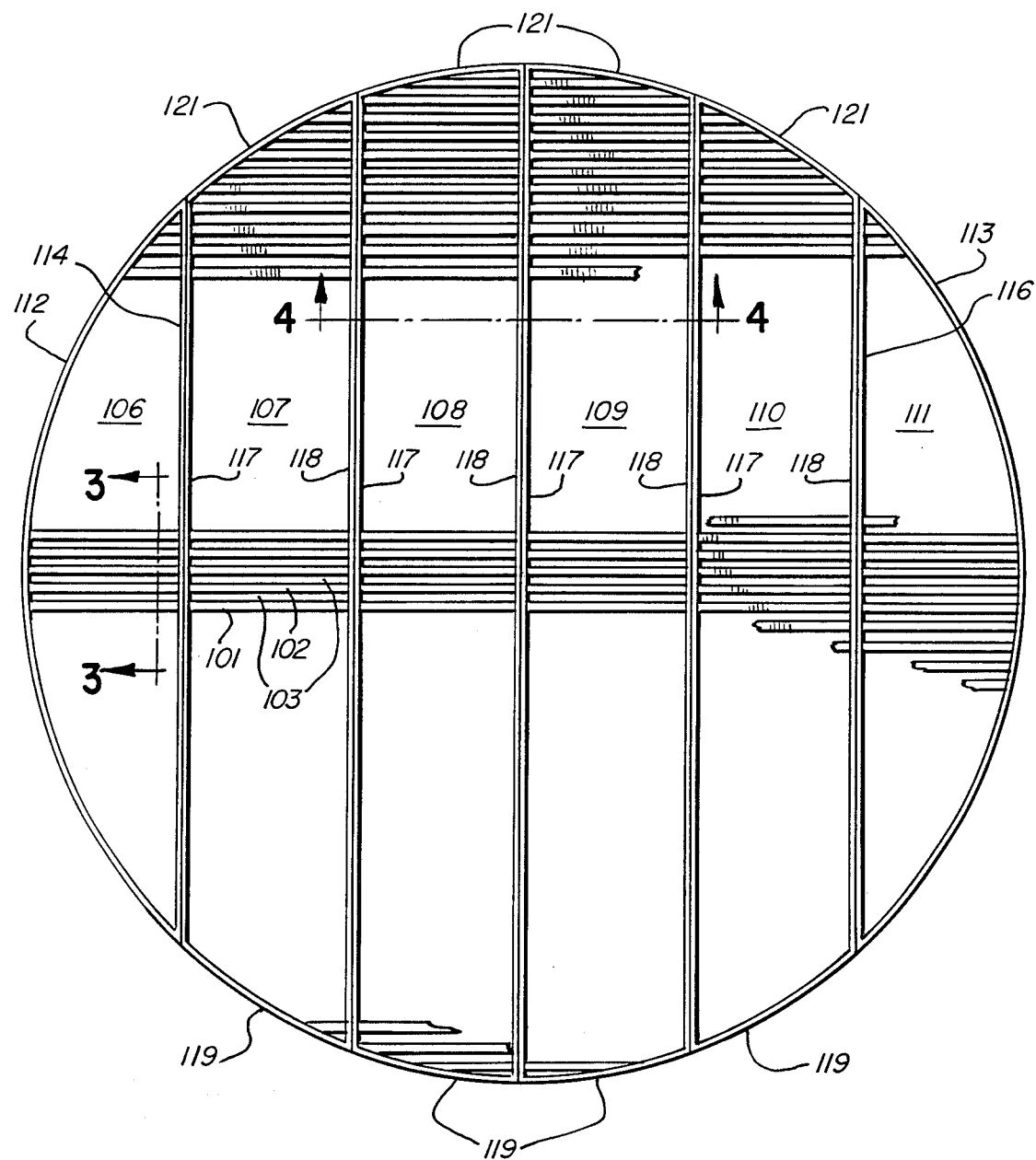
FIG. 2 is an enlarged plan view of a preferred embodiment of the packing support grid in the contactor.

FIGS. 2, 3, and 4 show the structural details of a preferred embodiment of the packing support grid 14 which is the key feature of the present invention. As seen in FIGS. 2-4, the primary functional elements of the grid are two vertically spaced upper and lower layers or sets of thin, flat strips or bars having a rectangular cross section. Any suitable structural material may be used, preferably stainless steel. The bars are mounted on edge so as to extend across the internal diameter of the tower 13 with the bars arranged in parallel laterally spaced relationship. Although more than two spaced layers or sets of bars may be used, there will ordinarily be no advantage in using more than two sets. Also, the shape of the bars is not critical, and other cross sectional shapes, e.g., square, round, or oval, may be used. The thin flat strip configuration normally provides the best combination of strength and large open area.

As best seen in FIG. 3, the bars of the upper and lower sets are designated at 101 and 102, respectively, and the uniform elongated spaces between the adjacent bars of each set are designated at 103 and 104. The vertical spacing between the upper set of bars 101 and the lower set of bars 102 is designated at 105. As also seen in FIG. 3, the bars 101 and 102 are horizontally staggered or offset so that the upper bars 101 overlie the spaces 104 between the lower bars 102, and the lower bars 102 are disposed below the spaces 103 between the upper bars 101. As illustrated, the bars 101 and 102 are preferably symmetrically offset so that the bars 101 are aligned with substantially the midpoints of the spaces 104 and the bars 102 are aligned with substantially the mid-points of the spaces 103.

In the illustrated embodiment of the invention, the support grid has been designed for a relatively large diameter tower. For ease of assembly in the field, the grid is constructed as a plurality of segmental compartments or subassemblies designated in FIG. 2 as 106 through 111. Each subassembly has a peripheral frame or side wall portion and a plurality of support bar portions. The outermost subassemblies 106 and 111 have outer arcuate side wall portions 112 and 113, respectively, and inner straight wall portions 114 and 116, respectively. The interior subassemblies 107 through 110 have opposite straight wall portions designated at 117 and 118 and arcuate end wall portions designated at 119 and 121. Support bar portions 101 and 102 are secured, e.g., by welding, between the opposite wall portions of the subassemblies 106 through 111, as best seen in FIGS. 2 and 4.

The subassemblies 106 through 111 are removably held together and supported in assembled relation, as seen in FIG. 2, by a ledge, brackets or other suitable support means (not shown) at the inner wall of the tower 13. In assembled relation, the support grid has, in effect, a circular outer band or frame formed from the aligned arcuate wall portions 112-121-113-119 that fit closely adjacent the inner wall of the tower (not shown). Likewise, the straight inner wall portions of the subassemblies 106 through 111 are disposed in close surface contact as shown in FIG. 2 at 114-117, 118-117 and 116-118. In the assembled structure, the bar portions 101 and 102 of the subassemblies 106 through 111 are longitudinally aligned, as seen in FIGS. 2 and 4. For application in a smaller diameter tower, the grid may have a unitary construction consisting of a one-piece circular outer band or frame and continuous upper and lower support bars extending across the band or frame.

The invention is not limited to any specific type of packing, but preferably a low density packing with a high percentage of voids is used, e.g., Tellerette packing, available from Ceilcote Company, Berea, Oh.; Cascade Mini-Rings packing, available from Glitsch, Incorporated, Dallas, Tex.; and Spiral-Pac packing, available from Croll-Reynolds Company, Inc., Westfield, NJ.

In order to achieve the objective of decreasing, minimizing or avoiding sulfur or other solids plugging problems, the packing support grid must have a relatively large total open area as well as relatively large individual openings. The grid must also have sufficient load carrying capacity to support the weight of the packing bed and the weight of the liquid traffic and suspended or deposited solids. In addition, the grid must retain the individual packing elements and prevent them from dropping through the openings in the grid.

The requirement for a relatively large total open area in the grid is important in order to avoid a high upward gas velocity in the packing bed near the support grid. A high upward gas velocity in this region promotes localized flooding of the packing which in turn promotes accumulation of solids particles on the packing. Also, in the Lo-Cat Process, it has been found that plugging of the packing bed becomes a problem after the packing support grid begins to plug. Partial plugging of the support grid impedes free downward flow of liquid and results in localized accumulation of liquid on the packing and deposition of solids.

In the illustrated grid design, the total open area is approximately 100% of the cross sectional area of the empty tower. The total open area is defined as the area of the obliquely arranged openings, designated at 115 in FIG. 3, between adjacent upper and lower bars 101 and 102. Preferably, the total open area of the grid is at least about 95% of the cross sectional area of the open tower and in most instances will be from about 85% to about 105% of the cross sectional area of the open tower. Relatively large individual openings in the grid are also necessary to allow for the free passage of solids particles and to prevent the accumulation of solids on the support grid itself and bridging of the openings by deposited solids.

It will be understood that in a packed tower the cross sectional area of the empty tower is partially obstructed by the bed of packing elements. In the case of a conventional support grid or grate, which consists of a single flat layer of crossed bars, this partial obstruction is most pronounced at the plane of contact between the packing and the support grid. In the present invention, however, the packing elements are supported partially at the top edges of the upper bars 101 and partially at the top edges of the lower bars 102. Consequently, the total open area through which gas can pass freely upwardly and liquid can pass freely downwardly is substantially greater than that of a conventional flat support grid. In fact, the total open area of the support grid of this invention may be greater than that of the packing bed per se, i.e., with no support grid.

The foregoing objectives are achieved by the use of two layers or sets of spaced support bars in the manner described above. The spacings between the bars, both lateral and vertical, are selected or predetermined in relation to the selected or predetermined size of the packing elements so that they are substantially the maximum permissible spacings, or not substantially less than the maximum permissible spacings, that are effective to prevent the packing elements from dropping through the grid. As seen in FIG. 3, the oblique dimension designated at 115 between adjacent upper and lower bars is the limiting dimension for this purpose. Consequently, the lateral and vertical bar spacings 103 and 105 must be selected so that the limiting spaces 115 are slightly smaller than the individual packing elements but not substantially smaller than necessary to retain the packing elements, thereby providing the desired relatively large total open area in the grid. The illustrated offset orientation of the bars and spaces of the two sets, with the bars of one set aligned with substantially the midpoints of the spaces between the bars of the other set, provides the maximum total open area. The elongated spaces 103 between adjacent bars provide the required large individual openings in the grid for free passage of solids.

As a specific example of the invention, the support grid shown in FIGS. 2-4 is constructed from 304L stainless steel. The walls of the subassemblies 106 through 111 are ¼ in. thick and have a vertical height of 4 in. The bars 101 and 102 are ¼ in. by 1 in. The outer diameter of the grid is 9 ft. 10½ in. The bars in each set are laterally spaced on 2 in. centers so that the spaces 103 and 104 are 1¾ in. The vertical spacing 105 is ¾ in. For this design, the packing elements may have a minimum size, e.g., in the case of Tellerette or Cascade Mini-Rings packing, of about 1½ in. height or thickness and about 3 in. width or diameter.

A packing support grid in accordance with the foregoing principles provides greatly improved performance compared with the performance of conventional supports such as gratings, screens, perforated trays, add the like. In the case of the Lo-Cat Process, sulfur plugging is either avoided or much longer run times are realized before sulfur plugging becomes so severe that the packed tower must be taken out of service for cleaning. Furthermore, once the packing becomes plugged by sulfur accumulations, it is possible to wash the sulfur from the packing without removing the packing from the tower because the relatively large total open area and the relatively large individual openings allow the sulfur particles to pass freely through the grid.

Although the invention has been described with reference to a specific embodiment, it will be understood that various modifications and alternatives may be utilized without departing from the scope of the invention as defined in the appended claims.

We claim:

1. A support grid for supporting a bed of packing elements of predetermined size in a packed tower for use in liquid-gas contacting;
    said grid comprising upper and lower sets of elongated bars mounted in parallel relation with a predetermined vertical spacing between said sets of bars and a predetermined lateral spacing between the respective bars of each set, the bars of the respective sets being horizontally offset so that the bars of the upper set overlie the lateral spaces between the bars of the lower set and the bars of the lower set are disposed below the lateral spaces between the bars of the upper set; and
    said vertical and lateral spacings being substantially the maximum permissible spacings effective to prevent said packing elements from dropping through said grid, whereby said grid has a large total open area so as to alleviate or avoid plugging of said grid and said packing elements with solids.

2. The support grid of claim 1, wherein said bars are symmetrically offset so that the bars of one set are aligned with substantially the mid-points of the spaces between the bars of the other set.

3. The support grid of claim 1, wherein said bars are thin flat strips mounted on edge.

4. The support grid of claim 1, wherein said grid comprises a plurality of subassemblies, each of said subassemblies having a peripheral frame portion and a plurality of bar portions, said subassemblies being adapted to be removably held together and supported within said tower with said bar portions in longitudinal alignment so as to provide said sets of elongated bars.

5. A packed tower for use in liquid-gas contacting:
    said packed tower having a support grid extending across the interior of the tower and a bed of packing elements of predetermined size supported on said grid;
    said grid comprising upper and lower sets of elongated bars mounted in parallel relation with a predetermined vertical spacing between said sets of bars and a predetermined lateral spacing between the respective bars of each set, the bars of the respective sets being horizontally offset so that the bars of the upper set overlie the lateral spaces between the bars of the lower set and the bars of the lower set are disposed below the lateral spaces between the bars of the upper set; and
    said vertical and lateral spacings being substantially the maximum permissible spacings effective to prevent said packing elements from dropping through said grid, whereby said grid has a large total open area so as to alleviate or avoid plugging of said grid and said packing elements with solids.

6. The packed tower of claim 5, wherein said bars are symmetrically offset so that the bars of one set are aligned with substantially the mid-points of the spaces between the bars of the other set.

7. The packed tower of claim 5, wherein said bars are thin flat strips mounted on edge.

8. The packed tower of claim 5, wherein said grid comprises a plurality of subassemblies, each of said subassemblies having a peripheral frame portion and a plurality of bar portions, said subassemblies being removably held together and supported within said tower with said bar portions in longitudinal alignment so as to provide said sets of elongated bars.

9. The packed tower of claim 5, wherein the total open area of said grid approximates 100% of the internal cross sectional area of the tower.

10. In a liquid-gas contacting method wherein a gas stream is contacted or scrubbed with a liquid in a packed tower under conditions such that solid particles are suspended or slurried in the liquid, the improvement comprising:
    providing in the packed tower a support grid extending across the interior of the tower, a bed of packing elements of predetermined size supported on said grid, and means for introducing said gas stream and said liquid into said tower and passing them in intimate contact through said bed of packing elements;
    said grid comprising upper and lower sets of elongated bars mounted in parallel relation with a predetermined vertical spacing between said sets of bars and a predetermined lateral spacing between the respective bars of each set, the bars of the respective sets being horizontally offset so that the bars of the upper set overlie the lateral spaces between the bars of the lower set and the bars of the lower set are disposed below the lateral spaces between the bars of the upper set; and said vertical and lateral spacings being substantially the maximum permissible spacings effective to prevent said packing elements from dropping through said grid, whereby said grid has a sufficiently large total open area to alleviate or avoid plugging of said grid and said packing elements with solids.

11. The method of claim 10, wherein said bars are symmetrically offset so that the bars of one set are aligned with substantially the mid-points of the spaces between the bars of the other set.

12. The method of claim 10, wherein said means includes an inlet for introducing the gas stream into said tower below said grid for passage of the gas stream upwardly through said bed, an inlet for introducing the liquid into said tower above said bed for passage of the liquid downwardly through said bed in countercurrent contact with the gas, an outlet from the upper portion of said tower for removing gas, and an outlet from the bottom portion of said tower for withdrawing said liquid and said suspended or slurried solid particles.

13. The method of claim 10, wherein said bars are thin flat strips mounted on edge.

14. The method of claim 10, wherein said grid comprises a plurality of subassemblies, each of said subassemblies having a peripheral frame portion and a plurality of bar portions, said subassemblies being removably held together and supported within said tower with said bar portions in longitudinal alignment so as to provide said sets of elongated bars.

15. The method of claim 10, wherein said gas stream contains hydrogen sulfide, said liquid comprises an aqueous oxidizing solution, and said contacting is carried out under conditions effective for oxidizing the hydrogen sulfide to elemental sulfur particles.

16. The method of claim 15, wherein said aqueous oxidizing solution comprises a chelated polyvalent metal.

17. The method of claim 16, wherein said polyvalent metal is iron.

18. In a liquid phase oxidation process for removing hydrogen sulfide from a hydrogen sulfide containing gas stream wherein said gas stream is contacted or scrubbed in a gas-liquid contactor with an aqueous oxidizing solution under conditions effective for oxidizing hydrogen sulfide to elemental sulfur particles that are suspended or slurried in said aqueous solution, the improvement comprising:

providing a packed tower as said contactor;

said packed tower having a support grid extending across the interior of the tower, a bed of packing elements of predetermined size supported on said grid, and means for introducing said gas stream and said aqueous solution into said tower and passing them in intimate contact through said bed of packing elements;

said grid comprising upper and lower sets of elongated bars mounted in parallel relation with a predetermined vertical spacing between said sets of bars and a predetermined lateral spacing between the respective bars of each set, the bars of the respective sets being horizontally offset so that the bars of the upper set overlie the lateral spaces between the bars of the lower set and the bars of the lower set are disposed below the lateral spaces between the bars of the upper set; and said vertical and lateral spacings being substantially the maximum permissible spacings effective to prevent said packing elements from dropping through said grid, whereby said grid has a sufficiently large total open area to alleviate or avoid sulfur plugging of said grid and said packing elements.

19. The process of claim 18, wherein said aqueous oxidizing solution comprises a chelated polyvalent metal.

20. The process of claim 19, wherein said polyvalent metal is iron.

* * * * *